Feb. 10, 1970     W. P. HOLCOMBE     3,494,262
PISTON
Filed Aug. 9, 1967     2 Sheets-Sheet 1
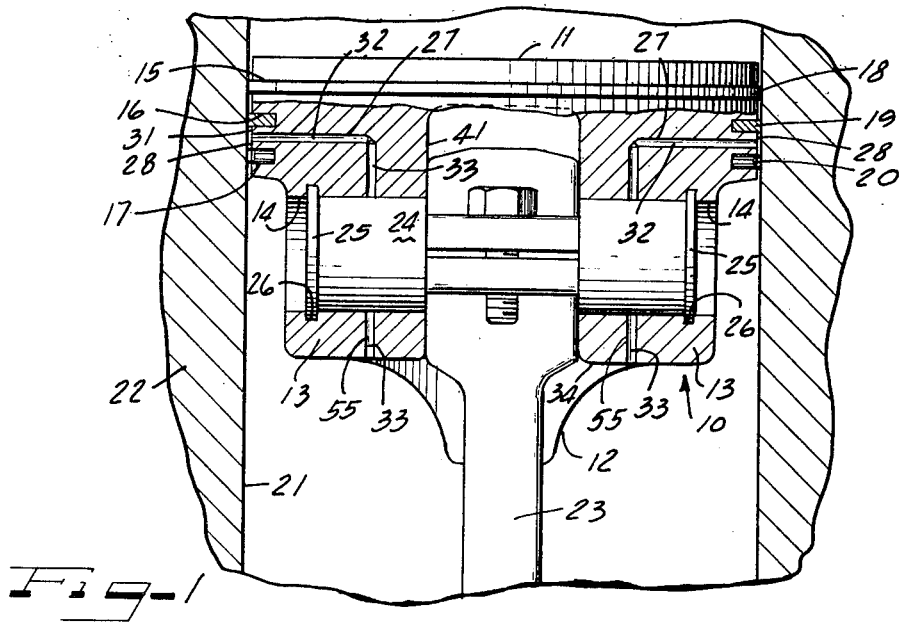
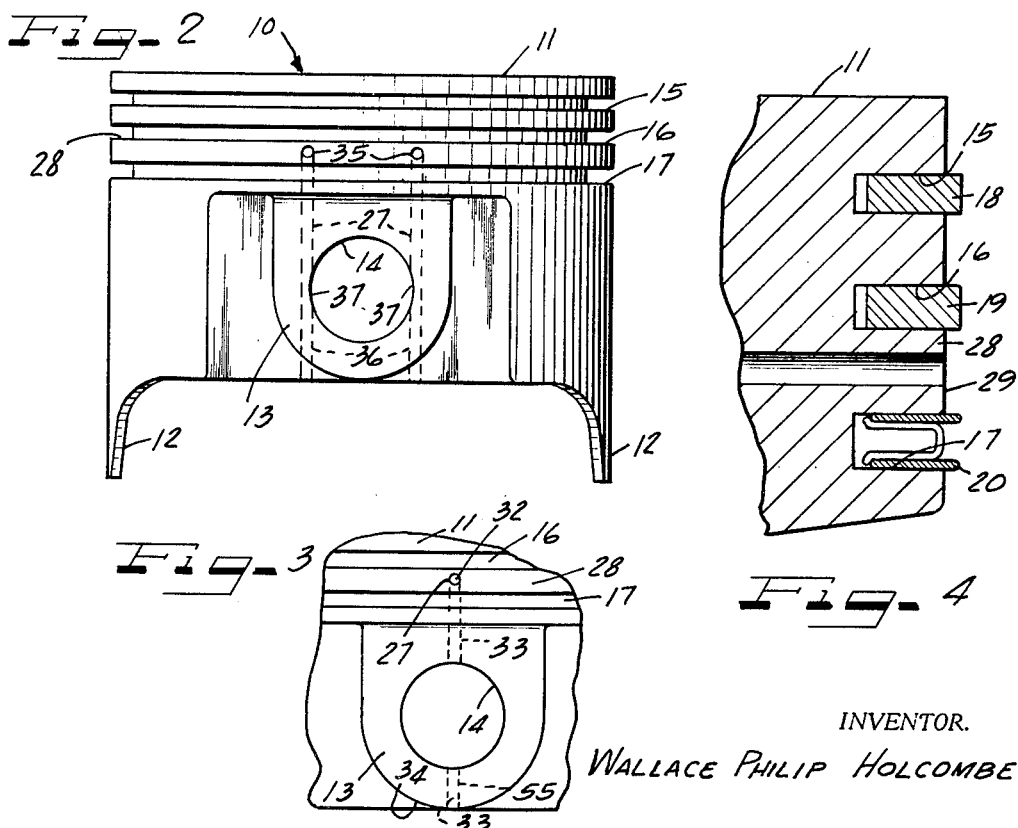
INVENTOR.
WALLACE PHILIP HOLCOMBE
BY *Hill, Sherman, Meroni, Gross & Simpson*     ATTORNEYS Feb. 10, 1970 W. P. HOLCOMBE 3,494,262
PISTON
Filed Aug. 9, 1967 2 Sheets-Sheet 2
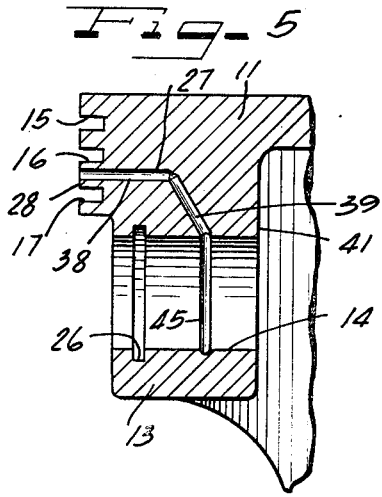
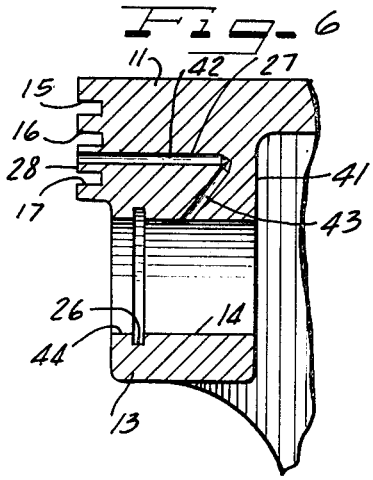
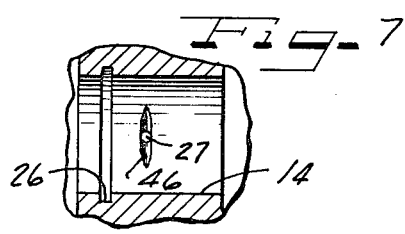
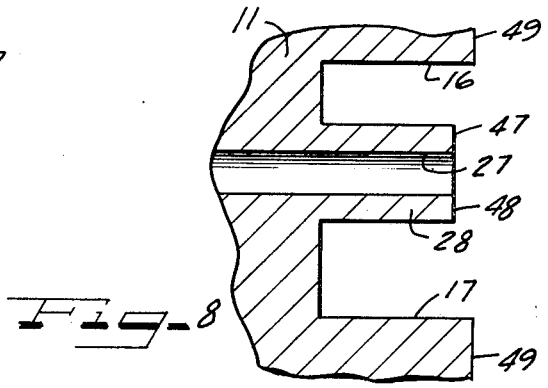
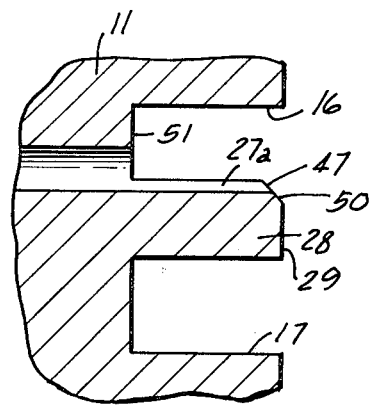
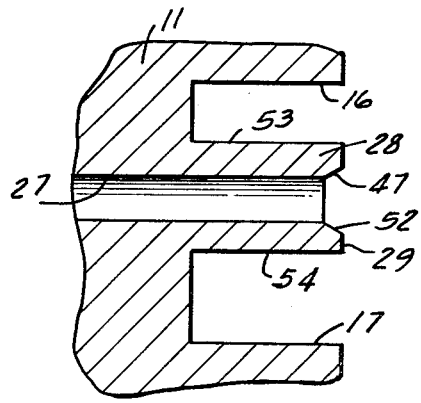
INVENTOR.
WALLACE PHILIP HOLCOMBE
ATTORNEYS

United States Patent Office 3,494,262
Patented Feb. 10, 1970

3,494,262
PISTON
Wallace Philip Holcombe, Birmingham, Mich., assignor to TRW Inc., Cleveland, Ohio, a corporation of Ohio
Filed Aug. 9, 1967, Ser. No. 659,459
Int. Cl. F01b 3/10
U.S. Cl. 92—159          8 Claims

ABSTRACT OF THE DISCLOSURE

A piston for use in an internal combustion engine having a small diameter bore oil passageway extending from each of the bearing bores for the piston pins into the body of the piston to a land defined by the grooves for the oil ring and an adjacent compression ring. Oil which is entrapped between the oil ring and the compression ring is forced through the passageways to lubricate the piston pins and their respective bearing bores. The passageways have various shapes and designs to allow the use of different methods for forming them. The land extending between the compression ring and the oil ring has a groove, a chamfer or an undercut portion to provide an additional reservoir for the oil used in lubricating the bearing surface of the piston pin and pin bore of the piston.

BACKGROUND OF THE INVENTION

Field of the invention

This invention pertains to a piston having integral lubricating passages for lubricating the piston pin and bearing.

Prior art

Pistons of the prior art to prevent failure due to overheating, scoring and galling of the piston pin and the piston pin hole or bore in the piston have been provided with grooves or oil feed holes in the piston pin hole or piston pin bearing. An example is my patent, U.S. Patent No. 3,179,021. These prior art pistons relied upon the seeping of the oil in the grooves or the splashing of the oil into the openings to lubricate the piston pin and the piston pin bearing bore.

SUMMARY OF THE INVENTION

The present invention provides a pressurized lubrication of the piston pin and the piston pin bearing bore. This is accomplished by providing a passageway leading from the piston pin bearing bore to a land defined by the grooves receiving the compression ring and the oil ring. Oil entrapped between the compression ring and the oil ring is forced by the pressure created by the movement of the piston rings on the cylinder wall through the passageway to lubricate the piston pin and the bearing in which it is held.

The invention further includes forming a reservoir in the land between the oil ring and its adjacent compression ring to hold the oil entrapped therebetween.

Accordingly, it is an object of the present invention to provide a new piston design having a pressurized lubrication passageway.

Another object of the present invention is to provide a novel piston having a pressurized lubrication passageway extending between the bearing bores which hold an end of the piston pin to a land between the oil ring and adjacent compression ring.

A still further object of the present invention is to provide a piston having an oil reservoir formed in the land extending between the oil ring and an adjacent compression ring and having a passageway interconnecting the reservoir and the piston pin bearing bore in the boss of the piston.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

THE DRAWINGS

FIG. 1 illustrates the piston of the present invention, with parts in section for purposes of illustration, disposed in a cylinder and having a connecting rod and piston pin attached to the piston.

FIG. 2 is a side elevation of the piston illustrating an embodiment of the passageways arrangement.

FIG. 3 is a partial side elevation of the piston of FIG. 1 showing the arrangement of the lubricating passageway.

FIG. 4 is an enlarged cross-section of the piston of FIG. 1 showing the land and the passageway disposed between the piston rings.

FIG. 5 is a partial cross-section of a piston illustrating an embodiment of the piston of FIG. 1 showing another configuration of the lubricating passageway.

FIG. 6 is a partial cross-section of a piston illustrating a still different configuration of the oil lubricating passageway for a piston.

FIG. 7 is a fragmentary view showing the inner section of the oil lubricating passageway with the surface of the bearing bore.

FIG. 8 is an enlarged fragmentary view illustrating one embodiment of the oil reservoir.

FIG. 9 illustrates a second embodiment of the oil reservoir of the land between the piston rings, and FIG. 10 illustrates a third and preferred embodiment of the oil reservoir formed in the land between the piston ring grooves.

On the drawings: The principles of the present invention are particularly useful when embodied in a piston such as the internal combustion engine piston illustrated in FIG. 1 and generally indicated at 10. The piston 10 has a head portion 11, a skirt portion 12, a pair of wrist pin bosses 13, 13, each of which has a wrist pin bearing bore or piston pin hole 14. The head portion 11 has a plurality of piston ring grooves 15, 16 and 17 in which compression rings 18 and 19 are received in the grooves 15 and 16 and an oil seal ring 20 is disposed and received in the groove 17.

The piston 10, as shown in FIG. 1, is disposed in a piston cylinder 21 of an engine block 22, and connected to an engine crank by a connecting rod 23 which is connected to the piston 10 by a wrist or piston pin 24 whose ends are disposed in the wrist pin bores 14, 14 and held in this disposed position by snap or retaining rangs 25, 25 which are engaged in retaining ring grooves 26, 26 in the bores 14, 14.

The above-described piston and associated parts are well known in the prior art, and they do not form a part of this invention except as modified hereinbelow.

To provide lubricating oil under pressure to the surfaces of the wrist pin 24 engaged by the surfaces of the wrist pin bearing bores 14, 14, a bore or passageway 27 extends from each of the bearing bores 14 to a land 28 which is defined by the grooves 16 and 17. The oil ring 20 and the adjacent compression ring 19, together with a surface of the cylinder wall 21 and the outer surface 29 of the land 28 define a chamber 31 in which oil scraped by the compression ring 19 from the cylinder wall 21 is entrapped and held under a pressure controlled by the metering and distributing action of the oil ring 20. The bore or passageway 27 provides a means to convey the oil entrapped in the chamber 31 to the surfaces of the bearing bore 14 and the wrist pin 24 to provide a pressurized lubrication thereof.

The bore 27, as illustrated in FIG. 1, is formed by drilling radially into the body of the piston from the surface 29 of the land 28, a first portion 32 which is substantially parallel to the axis of the wrist pin bearing bore 14. A second portion 33 is formed by boring or drilling perpendicular to the axis of the wrist pin bearing bore 14 from the bottom or lower portion 34 of the boss 13 into the land portion 11 to intersect the first portion 32 as best shown in FIG. 3. A modified version of the passageway or bore 27 as best illustrated in FIG. 2, consists of a pair of bores 35, 35 extending inward from the surface 29 of the land 28 and parallel to the axis of the wrist pin bearing bore 14. A pair of second portions 36, 36 are drilled to intersect the first portions 35, 35 and to intersect the surface of the wrist pin bearing bore 14 tangentially to form openings or holes 37, 37.

A second modification of the lubricating passageway 27 is shown in FIG. 5. The passageway 27 has a radially inwardly extending first portion 38 which is parallel to the axis of the bearing bore 14 and intersects a second portion or bore 39 which extends between the surface of the wrist pin bearing bore 14 at an angle to the axis of the bore 14 which is less than 90°. The purpose of the angular bore 39 is to allow this portion to be formed by a drill inserted through a connecting rod cavity 41 between the bosses 13, 13 of the piston 10.

A third modification of the passageway 27, as illustrated by FIG. 6, consists of drilling a first portion 42 parallel to the axis of the bearing bore 14 and extending radially inwardly from the land 28. A second portion 43 is drilled between the bearing bore 14 and the first portion 42 at an angle by a drill entering the mouth portion 44 of the bearing bore 14. The angle of the portions 39 and 43 of the passageway 27 is such to allow the drill and chuck to enter the bearing bore 14.

In each of the above-described modifications of the bore passageway 27, a circumferential oil distribution groove 45 may be provided as shown in FIG. 5, to distribute the oil about the surface of the bore 14 and the surface of the wrist pin 24 disposed in the bore 14. Instead of a circumferential groove 45, a partial groove or thumbnail slot 46 may be provided at the intersection of the bore 27 with the surface of the bearing bore 14. The purpose of either the groove 45 or the slot 46 is to assist in the distribution of the lubricating oil to the surfaces of the bore 14 and pin 24.

As stated hereinbefore, a chamber 31 is formed between the compression ring 19, the surface of the cylinder wall 21, the oil ring 20 and the surface 29 of the land 28 to receive the oil scraped from the surface 21 of the cylinder by the compression ring 19. To allow for this buildup of the oil, a reservoir 47 is provided in or on the land 28. FIGS. 8, 9 and 10 show various structures for the reservoir. In FIG. 8, the land 28 has an undercut surface 48 which has a diameter less than the surface 49 of the head portion 11 to form the reservoir 47.

In FIG. 9, the reservoir 47 is formed by providing a chamfer 50 on a corner of the land 28 adjacent the groove 16. The bore 27a of the passageway 27 intersects the chamfer 50 and as illustrated the base 51 of the groove 16.

In FIG. 10, the reservoir 47 is formed by providing a circumferential groove 52 in the surface 29 of the land 28 and the groove 52 is spaced from the grooves 16 and 17 by peripheral portions of the land 28. The reservoir 47 formed by the groove 52 is preferred over the previously mentioned reservoirs since it does not reduce the diameter of the land 28 and the height of the walls 53 and 54 of the respective grooves 16 and 17, and therefore the land 28 having the groove 52 or a reservoir provides better support for the oil ring 20 and the compression ring 19 than the undercut or chamferred land.

In the embodiment illustrated in FIGS. 1 and 3, the portion 55 of the bore 33 extending through the lower portion 34 of the boss 13 provides a vent or second passageway which allows excess oil to be drained or to be discharged from the wrist pin bearing bore.

Although various minor modifications might be suggested by those versed in the art, it should be understood that I wish to employ within the scope of the patent warranted hereon, all such embodiments as reasonably and properly come within the scope of my contribution to the art.

I claim as my invention:

1. In combination with an engine cylinder, a piston and piston ring assembly mounted in said cylinder comprising a piston having a head portion of smaller diameter than the cylinder, a skirt portion and a wrist pin boss portion, said wrist pin boss portion providing a bearing surface adapted to receive a wrist pin, said head portion having at least one compression ring groove, an oil ring groove closely adjacent a compression ring groove, and a land between said compression ring groove and said oil ring groove, a compression ring in said compression ring groove sealingly engaging said cylinder, an oil ring in said oil ring groove engaging said cylinder and adapted to scrape oil from said cylinder below said compression ring, said land, oil ring, compression ring, and cylinder co-acting to define an annular chamber around the piston head, said oil ring metering oil from said cylinder into said chamber and effective to entrap oil in said chamber during reciprocation of the piston in the cylinder for creating a pressurized source of oil, and a small diameter bore passageway in said piston directly connecting said chamber with the bearing surface of said pin boss portion for delivery of pressurized oil to said surface whereby a wrist pin in said boss portion is continuously lubricated with pressurized oil during reciprocation of the piston in the cylinder.

2. The combination of claim 1 wherein said passageway is composed of a small diameter bore having a portion extending radially through the land into the piston head and a portion extending generally axially of the piston into the bearing surface of the wrist pin portion.

3. The combination of claim 1 wherein the piston has a pair of diametrically opposed pin boss portions depending from the piston head each defining a radially extending cylindrical wall providing bearing surfaces for the end portions of a wrist pin and wherein said passageway is composed of small diameter bores through the piston head connecting the annular chamber with the cylindrical bearing walls intermediate the radial inner and outer ends of the pin boss portions.

4. The combination of claim 1 wherein the passageway is a small diameter bore extending radially into the piston head from said land and wherein the land is chamfered toward said bore to increase the capacity of said annular chamber without decreasing the radial depth of the adjacent sidewalls of the ring grooves.

5. The combination of claim 1 wherein the passageway is a small diameter bore extending radially inward from the land and communicating with the compression ring groove.

6. In combination, an internal combustion engine cylinder, a piston reciprocably mounted in said cylinder, having a head portion with a plurality of piston ring grooves there around, diametrically opposed pin boss portions depending from said head portion radially inward therefrom and skirt portions depending from said head portion between said pin boss portions and riding on said engine cylinder, said pin boss portions having radially extending bores therethrough, a wrist pin having end portions seated in said bores, retaining means in said bores engaging the ends of said wrist pin to hold the wrist pin in the bores, an oil ring in the groove of said head which is closest to said skirt and wrist pin boss portions, a compression ring in a groove of the head adjacent said oil ring, said head having a land between said oil ring receiving groove and the adjacent compression ring receiving groove, said compression ring projecting from said head and sealingly engaging said cylinder, said oil ring projecting from said head and scraping said cylinder to meter oil from the cylinder into a sealed chamber around said land provided by the piston head, the cylinder, the oil ring and the adjacent compression ring, and small diameter bore passageways extending through said land into said head and thence through the pin boss portions to communicate with the bores defined thereby for lubricating the ends of the pin seated in said bores, and said oil ring being effective to trap oil under pressure in said sealed chamber whereby the pin boss ends are lubricated with pressurized oil.

7. The combination of claim 6 wherein the small diameter bore passages include two circumferentially spaced passages for each pin boss.

8. The combination of claim 6 wherein the small diameter bore passages communicate with the wrist pin ends radially inward from the retaining means and radially outward from the inner ends of the pin boss portions.

References Cited

UNITED STATES PATENTS

| | | | |
|---|---|---|---|
| 1,020,638 | 3/1912 | Craig | 92—160 |
| 1,021,577 | 3/1912 | De Fazi | 92—160 |
| 1,430,928 | 10/1922 | Spencer | 92—159 X |
| 1,787,119 | 12/1930 | Noble | 92—160 |
| 1,916,978 | 7/1933 | Harper | 92—160 |
| 2,244,166 | 6/1941 | Marien | 92—160 |
| 2,511,458 | 6/1950 | Bramberry | 92—160 |
| 2,702,219 | 2/1955 | Sintz et al. | 92—160 |
| 3,179,021 | 4/1965 | Holcombe | 92—158 |
| 3,272,092 | 9/1966 | Vielmo et al. | 92—158 X |

FOREIGN PATENTS

| | | |
|---|---|---|
| 627,856 | 10/1927 | France. |
| 1,038,532 | 5/1953 | France. |
| 140,552 | 4/1920 | Great Britain. |

MARTIN P. SCHWADRON, Primary Examiner

I. C. COHEN, Assistant Examiner

U.S. Cl. X.R.

92—160